Dec. 2, 1958 H. W. KOREN ET AL 2,863,076

DIELECTROSTRICTIVE SIGNAL AND ENERGY TRANSDUCERS

Original Filed Sept. 9, 1947 6 Sheets-Sheet 1

INVENTORS
J.W. CROWNOVER
H.W. KOREN
BY
GREENE PINELES + DURR
ATTORNEY

Fig 1-A
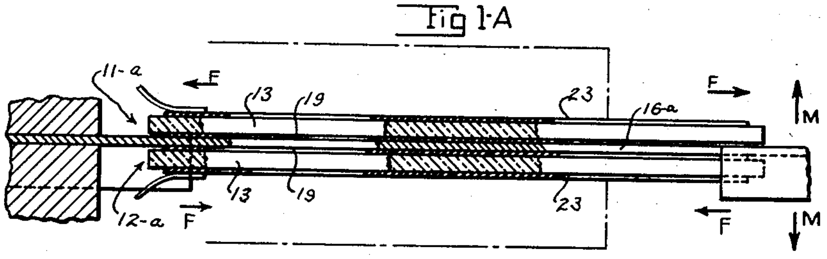
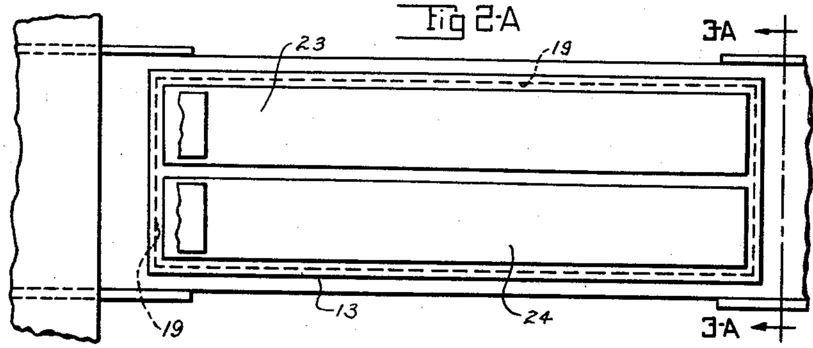
Fig 2-A, Fig 3-A
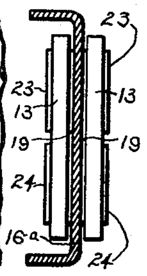
Fig 4-A
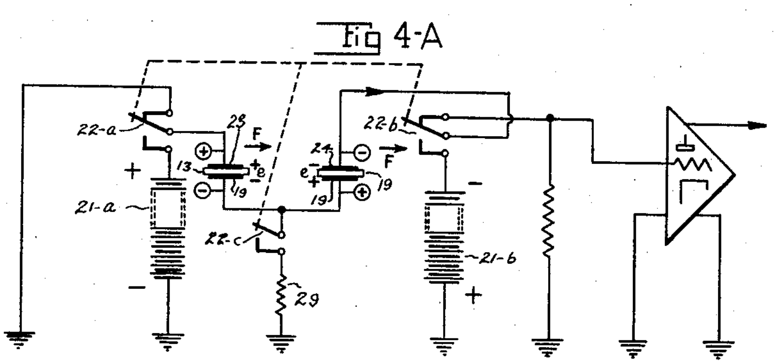
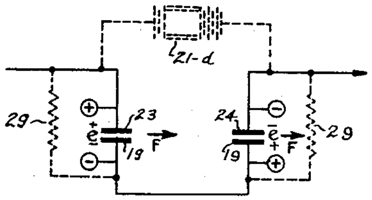
Fig 4-AB
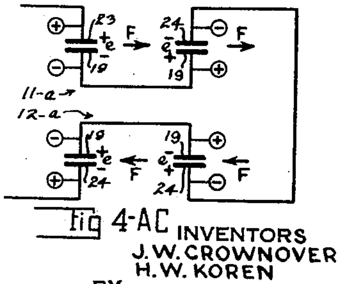
Fig 4-AC
INVENTORS
J. W. CROWNOVER
H. W. KOREN
BY
GREENE PINELES & DURR
ATTORNEY Dec. 2, 1958 H. W. KOREN ET AL 2,863,076
DIELECTROSTRICTIVE SIGNAL AND ENERGY TRANSDUCERS
Original Filed Sept. 9, 1947 6 Sheets-Sheet 3
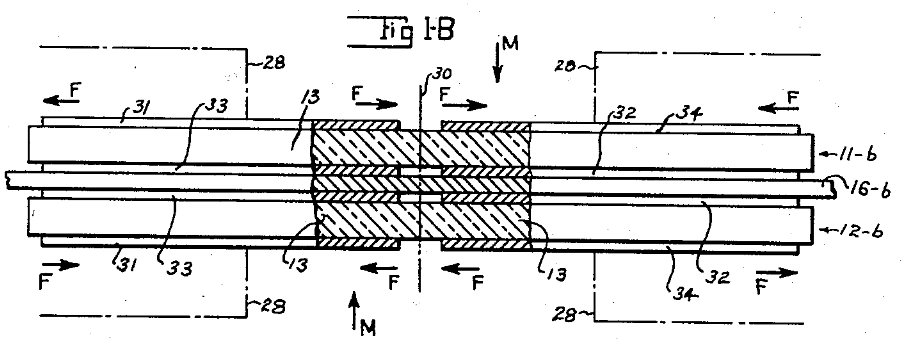
Fig 1-B
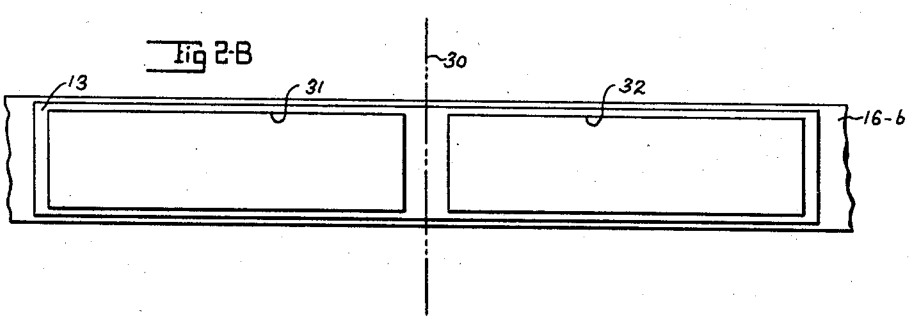
Fig 2-B
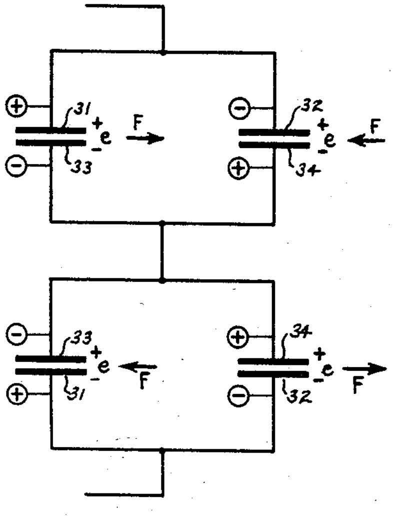
Fig 4-B
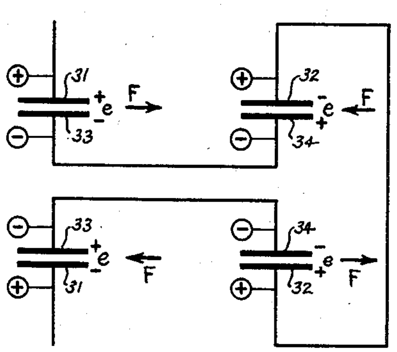
Fig 4-BC
INVENTORS
J. W. CROWNOVER
H. W. KOREN
BY GREENE PINELES + DURR
ATTORNEY Fig 2-C
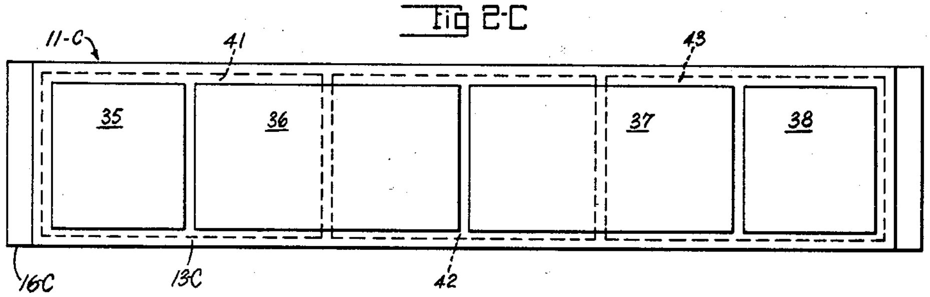
Fig 1-C
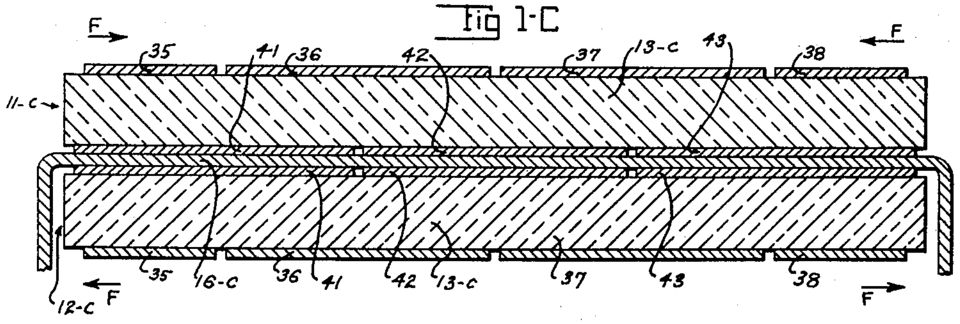
Fig 4C
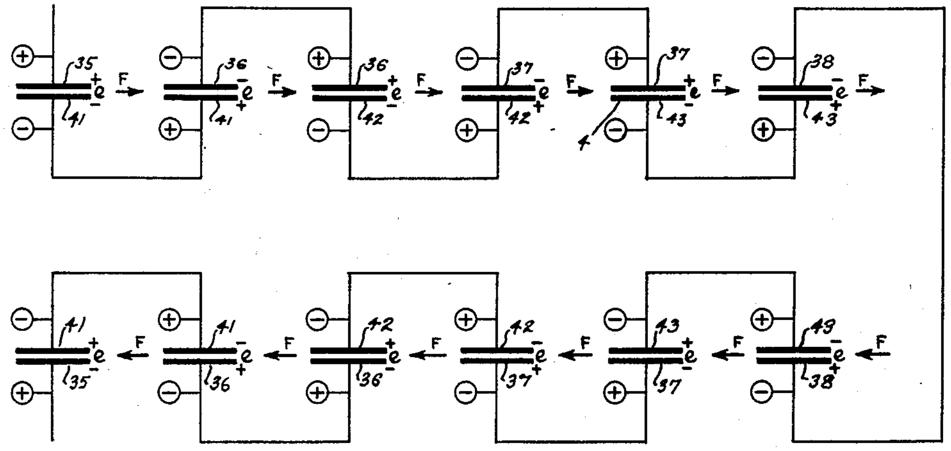
INVENTORS
J. W. CROWNOVER
H. W. KOREN
BY
GREENE PINELES & DURR
ATTORNEY Fig 2-D
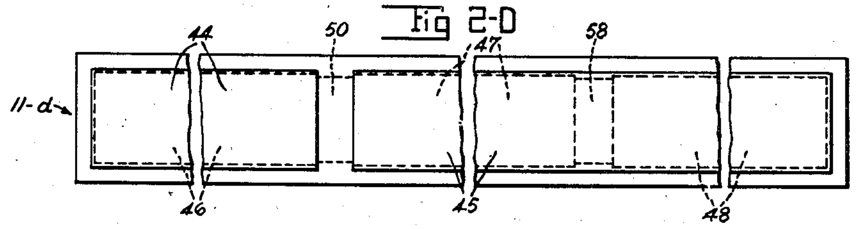
Fig 1-D
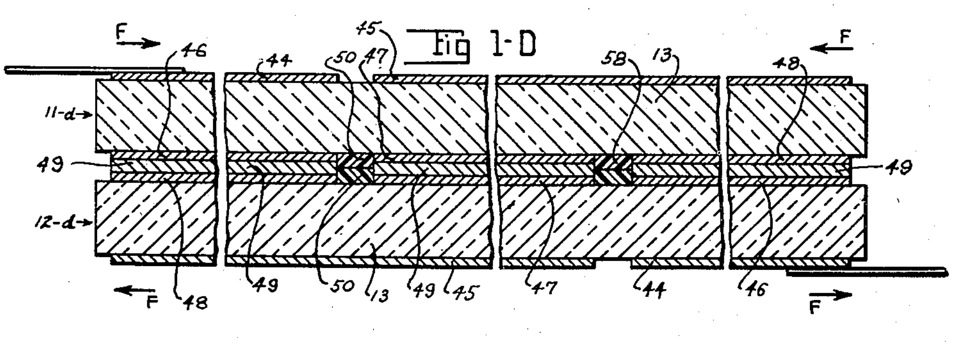
Fig 2-DE
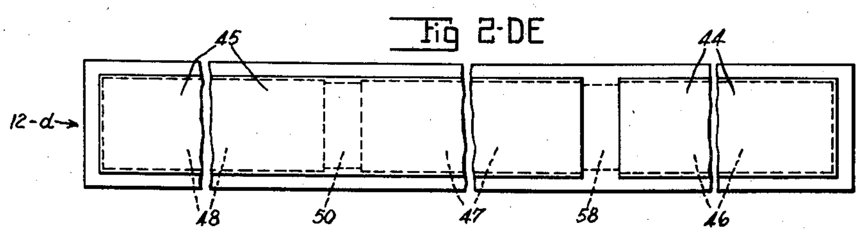
Fig 4-D
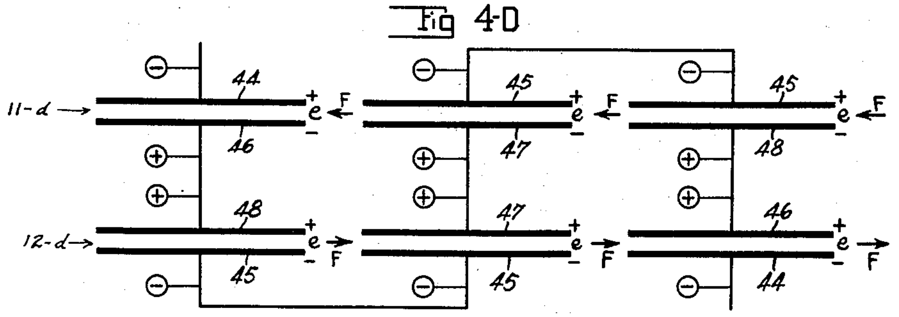
INVENTORS
J.W. CROWNOVER
H.W. KOREN
BY
GREENE PINELES & DURR
ATTORNEY

INVENTORS
J.W. CROWNOVER
H.W. KOREN
BY
GREENE PINELES & DURR
ATTORNEY

United States Patent Office 2,863,076
Patented Dec. 2, 1958

2,863,076

DIELECTROSTRICTIVE SIGNAL AND ENERGY TRANSDUCERS

Heiman W. Koren, Bronxville, N. Y., and Joseph W. Crownover, La Jolla, Calif., assignors to Sonotone Corporation, Elmsford, N. Y., a corporation of New York Original application September 9, 1947, Serial No. 772,934, now Patent No. 2,769,867, dated November 6, 1956. Divided and this application October 19, 1956, Serial No. 617,158

18 Claims. (Cl. 310—8.6)

This invention relates to signal and energy transducers which transduce one form of signals or energy into another form of signals or energy, such as phonograph pickups, microphones, strain gauges, sound and vibration emitters, or in general to devices and apparatus by means of which mechanical signals or energy are transduced into corresponding electric signals or energy, or by means of which electric signals or energy are transduced into corresponding mechanical signals or energy.

The present invention relates to solid dielectric capacitors embodying a solid ceramic refractory dielectric material composed essentially of random oriented crystal particles, such as titanate particles which may be permanently electrically polarized into piezoelectric ceramic bodies which, when subjected to mechanical strains or motion, will produce corresponding electric potential across its electrodes, and when electric potentials are applied to the electrodes the capacitor structure will be subjected to corresponding strains or motion.

Among the objects of the invention is such piezoelectric ceramic signal transducer operating with a predetermined mechanical mode wherein different portions of its ceramic body are electrically polarized in opposite directions relatively to each other so that they transduce in aiding relation when operating with said mode. In the present specification and claims, the statement that different body portions of an integral ceramic body have opposite polarization has the same meaning as the statement that the piezoelectric axes of different body portions of such integral ceramic body have opposite directions. In other words, the expressions "directions of polarization" or "direction of electric polarization" of a ceramic body portion have the same meaning as the "piezoelectric axis" of such ceramic body portions.

The foregoing and other objects of the invention will be best understood from the following description of exemplifications thereof, reference being had to the accompanying drawings, wherein.

Figure 1:
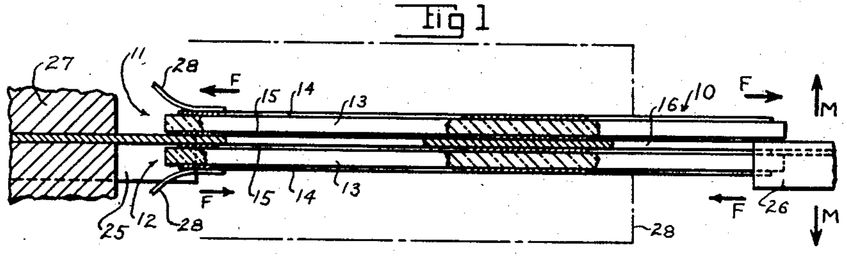
Fig. 1 is a side view of one form of ceramic piezoelectric transducer structure of the invention.
Figure 2:
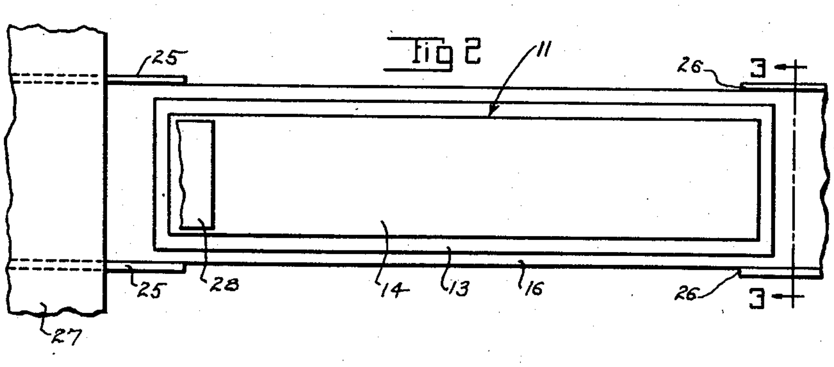
Fig. 2 is a top view of the structure of Fig. 1.
Figure 4:
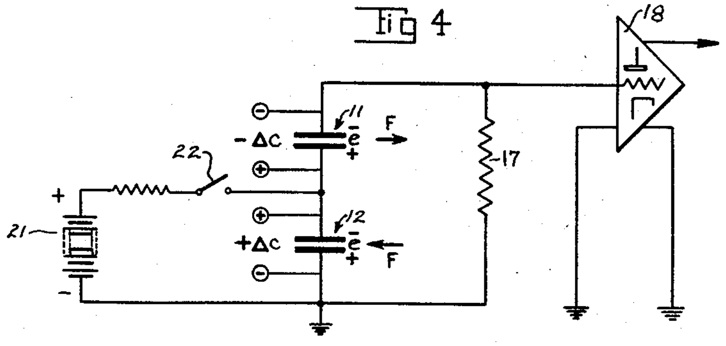
Fig. 4 is a circuit diagram showing one form of polarizing arrangement for polarizing the dielectric elements of the transducer of Figs. 1 to 3.
Figure 5:
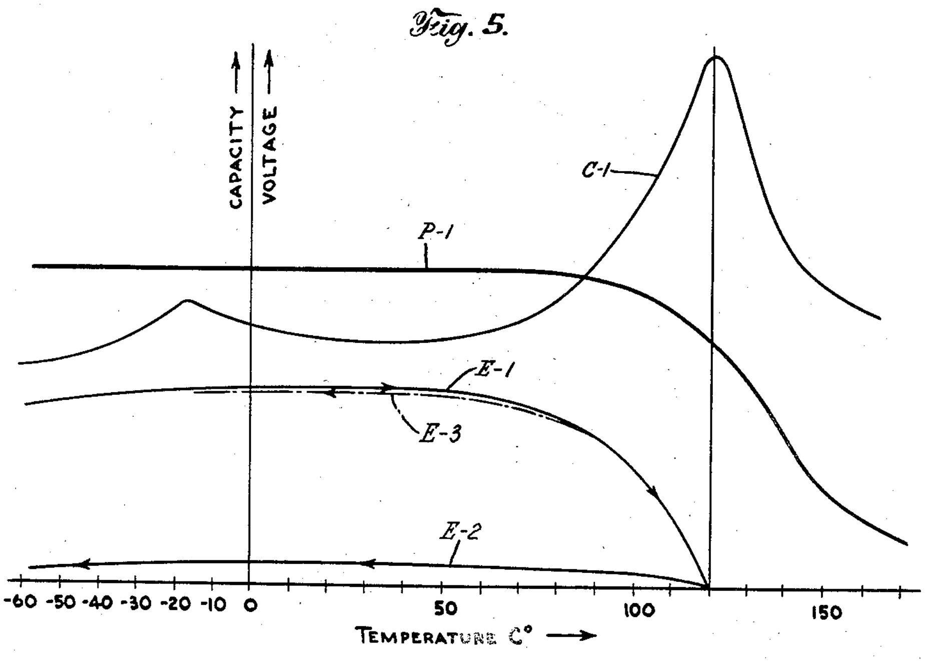
Figure 6:
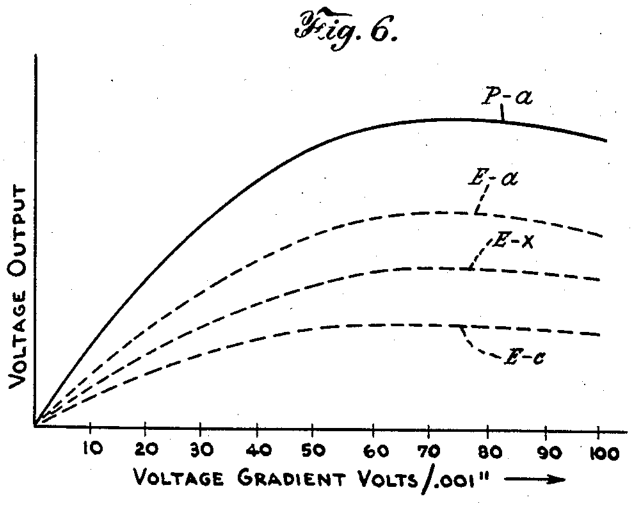

Figs. 1–A to 4–A, inclusive, are figures similar to Figs. 1 to 4 of another form of transducer arrangement of the invention;

Fig. 4–AB is a modified form of circuit diagram for polarizing the transducer structure of Figs. 1–A to 3–A;

Fig. 4–AC shows diagrammatically the electrical circuit relationship of the transducer structure of Figs. 1–A to 3–A;

Figs. 1–B and 2–B are similar to Figs. 1 and 2 of another modification of a transducer of the invention;

Figs. 4–B and 4–BC are two circuit diagrams showing two forms of circuit relationship of the individual elements of the transducer structure of Figs. 1–B and 2–B;

Figs. 1–C and 2–C are views similar to Figs. 1 and 2 of a further form of transducer arrangement of the invention;

Fig. 4–C is a circuit diagram showing the circuit relationship of the elements of the transducer structure of Figs. 1–C and 2–C;

Fig. 1–D is a view similar to Fig. 1 of a further form of transducer arrangement of the invention;

Figs. 2–D and 2–DE are a top view and bottom view of the transducer unit of Fig. 1–D;

Fig. 4–D is a circuit diagram showing the circuit relationship of the transducer elements of the transducer structure of Figs. 1–D and 2–DE; and Figs. 5 and 6 show two sets of curve diagrams representing the operating characteristics of dielectrostrictive capacitor-transducers of the invention which render them suitable for use as mechano-electric or piezoelectric transducers.

Condensers or capacitors having a solid ceramic refractory dielectric layer composed essentially of random oriented titanate particles have come into wide use. The titanate dielectrics have a high dielectric constant, in the order of thousands, and provide a large capacity in a small unit volume. They also exhibit a low power factor at high frequencies. They have the further advantage, in that the titanate dielectric layers may be made by standard ceramic procedures in the form of refractory ceramic bodies, which are free from deterioration due to penetration of moisture into the dielectric.

One phase of the invention is the discovery that the entire volume of the solid random oriented dielectric titanate structure of such capacitors or condensers may be electrically permanently polarized and converted into dielectrostrictive or piezoelectric transducers by connecting such titanate capacitor structure to a source of direct current potential so that a voltage gradient—which is a substantial fraction of its breakdown voltage or dielectric strength—is applied to the dielectric titanate body of such condenser for a shorter or a longer period of time depending on the composition of the titanate dielectric body.

One form of a capacitor structure of a signal transducer exemplifying the invention will now be described in connection with Figs. 1 to 3, which show such condenser with the dimensions of the several layers exaggerated for the sake of clarity.

The capacitor transducer structure, generally designated 10, comprises two capacitor units 11 and 12, each having a thin solid dielectric layer 13 composed essentially of a refractory ceramic titanate material. To the two exposed extended bounding surfaces of each dielectric layer 13 are united extended surface electrodes 14, 15. Each surface electrode 14, 15 comprises an extremely thin layer or coat of an electrically conducting material such as a silver composition which has the property of becoming bonded and united in extremely intimate and direct contact with the underlying exposed surface particles of the solid dielectric layer 13. In order to give the two capacitor units 11, 12 substantial mechanical strength notwithstanding the fragile character of their thin dielectric structure, they are shown joined to a ductile sheet backing member 16, as by uniting their thin electrode coatings 15 to the exposed opposite surfaces of the relatively tough thin sheet member 16 in such manner that the sheet member 16 shall provide a non-fragile backing for each of the two capacitor elements 11, 12. The sheet member 16 may be made either of a ductile metal or of a strong synthetic resin or plastic sheet material, for instance, such a fabric impregnated with a synthetic resin or plastic of the type long and generally used in making tough sheets.

The sheet element 16 which serves as a backing of the two capacitor elements 11, 12 is made of metal and utilized as an electrode structure for the two condenser elements 11, 12, which are united thereto and which form therewith a substantially integral mechanically strong multiple capacitor transducer structure.

By combining a capacitor transducer structure of the type shown in Figs. 1 and 2 with a ductile backing sheet, it is given great mechanical strength without substantially increasing its stiffness against deformation or bending in a direction perpendicular to the plane of the backing sheet element 16. However, the backing sheet element will add greatly to the strength of the capacitor transducer structure against forces in the direction substantially parallel to the plane of the sheet member 16.

Thin titanate dielectric layers for such thin condensers 11, 12 of the type shown may be made by known ceramic procedures.

The thin dielectric layers 11, 12 are coated with thin surface electrodes by applying through a screen or by spraying a thin film of a mixture containing finely divided metallic silver and a ceramic frit, in such proportions that when the so-coated dielectric layers are subjected to an additional firing in an oxidizing atmosphere at a temperature such as 700° C., the frit will melt and the metallic silver particles will be adherently united and bound to the interface of the exposed dielectric layer surface. The silver frit used for electrode coating 13 is loaded with sufficient metallic silver so that the solidified frit forms a highly effective electric conductor and does not interpose an electric insulating medium between the extremely thin silver coating electrode and the dielectric body.

The thin fired dielectric layer with the electrode coating formed thereon is then copper-plated for a short instant, such as a minute, in an acid copper-plating bath of standard composition so as to deposit an extremely thin layer of copper on the silver electrode coatings.

Figs. 1 and 2 show the backing sheet 16 as being wider and longer than the two capacitor elements. However, there are many applications in which the backing sheet may be confined to the area of the capacitor elements 11, 12.

If such capacitor element is subjected to a tension strain in the direction of its longitudinal axis, as indicated by the vectors F in Fig. 1, its dielectric constant and hence its capacity will decrease. Conversely, if such capacitor unit is subjected to longitudinal compression dielectric constant and hence the capacity of such capacitor element will be increased.

As stated above, capacitor structures of the foregoing type are converted into mechano-electric or electromechanical energy transducing structures by inducing in the dielectric layers of the capacitor elements a permanent electric volume polarization. In particular we have discovered that the entire volume of the solid titanate dielectric layers of capacitor elements of the foregoing type which are composed essentially of polygranular randomly oriented titanate particles, may be electrically permanently polarized so that when the dielectric body of such capacitor element is subjected to a strain which increases or decreases its capacity it will generate at its electrodes voltages corresponding to the strain, or vice versa.

According to the invention, a combined multiple capacitor structure of the general type shown in Figs. 1 and 2 may be permanently polarized in opposite senses so that when the two capacitor elements of such polarized capacitor structure are simultaneously subjected to strains of opposite character the changes of the dielectric constant or the capacity of the two capacitor elements will produce aiding voltages. According to the invention, the dielectric structure of such capacitor structure may be permanently electrically polarized—and thereby converted into a dielectrostrictive or piezoelectric transducer—by connecting each capacitor unit to a source of direct current potential—up to almost the breakdown voltage gradient—so that a larger or smaller fraction of its breakdown voltage gradient is applied thereto for a shorter or longer period of time, depending upon the characteristics of the specific titanate body of the individual capacitor elements.

When two such capacitor elements are combined into a bilaminate structure such as shown in Figs. 1 and 2, such permanently induced polarization may be conveniently applied in the proper sense so that their effectiveness aids when functioning as a mechano-electro or electro-mechanical transducer structure.

Fig. 4 shows one form of an electric circuit by means of which such bilaminate capacitor unit which is to serve as an energy transducer may be permanently polarized in accordance with the invention. The capacitor elements 11, 12 are shown connected in series across a resistance 17 which may serve as an input resistance of an amplifier 18 which serves to amplify the electric signals generated by the transducer structure in response to mechanical strains imparted thereto. A source of direct current charging potential which may be provided by a battery 21 which is shown connected through a switch 22 between the terminals to the two capacitor elements 11, 12, to the grounded side of the resistance 21, so as to apply to the two capacitor elements 11, 12 equal unidirectional voltages which act electrically in parallel across the two capacitors but which are oppositely directed with respect to the series relationship of the two capacitor elements 11, 12.

We have found that when such charging potential is applied to titanate capacitor elements, the grains of the entire dielectric structure of the capacitor elements are subjected to electric forces which we believe produce in them a permanent electric displacement corresponding to the applied external charging potential so that after removing the external charging potential such previously charged capacitor element exhibits a permanent electric polarization of substantially the entire volume of its dielectric structure. The so polarized dielectric structure of a titanate capacitor remains permanently polarized although its surface electrodes are permanently short-circuited for an indefinitely long period of time and it will, upon removal of the short circuit exhibit mechano-electric transducer characteristics corresponding to such volume polarization.

Thus such polarized capacitor structure will operate as a reversible mechano-electric energy transducer structure, if each of the condenser elements remains permanently shunted by a resistance or inductance exhibiting an impedance compatible with the other parameters of the associated operating circuit.

As used herein, the expression "mechano-electric" transducer is intended to mean an energy or signal transducing device which changes mechanical energy signals into electric energy or signals and which changes electric energy or signals into mechanical energy or signals.

In Fig. 4 the arrows F indicate the direction of the longitudinal forces shown applied to the two capacitor elements 11, 12 when the entire capacitor assembly structure is subjected to a bending strain for instance. Thus capacitor element 11 is subjected to a stress F while at the same time the capacitor element 12 is subjected to an opposite stress F. The legends $-\Delta C$ and $+\Delta C$ applied to the two condenser elements 11, 12 indicates the change of the capacitance produced in the two capacitor elements by the two opposite forces F and F. The legend $\mp$ applied to the two capacitor elements 11, 12 indicates the change in the incremental voltages produced in the two capacitor elements by the effect of the opposite strains F and the resulting opposite changes in the capacitance in the two capacitor elements when they have been permanently polarized by a D. C. potential source in the manner indicated.

In this application when referring to solid random oriented refractory titanates we have reference to titanates the particles of which have a generally perovskite structure although we do not intend to thereby exclude other refractory titanate structures. In general, all the titanates of the type described in the article by E. Wainer, entitled "High Titania Dielectrics" in the Transactions of the Electro-Chemical Society of volume 89, 1946, pages 47–71, are suitable for practicing the invention.

In Fig. 5 the curve C–1 shows the capacity of such capacitor element as a function of the temperature indicated on the abscissae axis. It will be noted that the capacitor element in question exhibits a maximum capacity at about 120° C. Dash-line curve branches E–1, E–2 represent the piezoelectric output voltage as a function of the temperature, when a constant displacement is imparted to the element. It will be seen that when the temperature is first increased from the low value to the highest value and then decreased from the highest value to the lowest value, as indicated by the arrows on curve branches E–1, E–2, the alternating voltage output of the capacitor element drops when the temperature of the titanate capacitor is brought to a value at which it has the highest maximum capacity, and that its mechano-electric output voltage remains low when the temperature of the capacity element is thereafter decreased along curve E–2.

In Fig. 5 the dash-dot line E–3 gives the mechano-electric output voltage of the capacitor element, when, after its temperature has been raised up to about 70° C., its temperature is lowered to its normal value from 70° C., to which it was first raised. Curve E–3 shows that if the temperature of the capacitor element is not raised to too high a value, raising and lowering of the temperature does not materially affect its mechano-electric output voltage. For practical purposes the voltage characteristic E–3 substantially coincides over the range up to about 100° C. with the curve E–1. It is also of interest to know that in performing the test represented by curves E–1, E–3, the capacitor element was retained at a temperature of about 100° C. for an extended period of several weeks without any apparent loss of its mechano-electric voltage output.

Dot-line curve P–1 shows the output voltage of the capacitor under constant mechanical displacement corresponding to the curves E–1, E–2, E–3, when its electrodes are connected to an external voltage source which was used to polarize the capacitor and give it the mechano-electric characteristics represented by curves E–1, E–2, E–3. It will be noted that when the temperature of the capacitor element is reduced even below minus 60° C., its mechano-electric output is not materially reduced.

We have found that generally similar characteristics are exhibited by condensers having dielectric bodies composed of titanates other than barium titanate alone. By way of example, there are given below data for a titanate capacitor unit having a dielectric body containing about 70 percent barium titanate and about 30 percent strontium titanate in solid solution. This condenser element had a highest maximum capacity at about 40° C. The other characteristics of this capacitor unit are qualitatively similar to those represented by the curves C–1, E–1, E–2, E–3 and P–1, except that the curves are shifted to lower temperature regions and that the ratio of ordinates of curve E–1 to the ordinates of curve P–1 was only about 30 percent as against 70 percent for the curves of Fig. 5.

In Fig. 6, curve P–*a* represents the mechano-electric voltage output for constant displacement of a capacitor element having the characteristics shown in the curves of Fig. 5 as a function of the voltage gradient of the charging potential applied to its dielectric layer when the charging source remains connected to the capacitor; curve E–*a* of Fig. 6 represents the corresponding mechano-electric voltage output when the charging source is disconnected from the capacitor.

As shown by curves P–*a* and E–*a* the mechano-electric output voltage or sensitivity rises to an asymptotic value as the voltage gradient of the charging voltage is increased and remains at a substantially constant value as the voltage is further increased till the breakdown voltage which occurs for the specific capacitor unit at a voltage gradient of about 100 volts per one thousandth of an inch of thickness.

When operating with a capacitor element of the invention having a titanate body which was composed of about 70 percent barium titanate and about 30 percent strontium titanate in solid solution, there was obtained a mechano-electric output or sensitivity characteristic represented by curve E–*c* in Fig. 6.

Capacitors made with other titanate compositions will exhibit generally similar characteristics, such as represented by curve E–*x* in Fig. 6.

Depending on the composition of the titanate dielectric body of a mechano-electric transducer of the invention, a longer or shorter period of charging period is required in order to induce in it the desired mechano-electric characteristics. Thus, in a case of a transducer having a dielectric body consisting essentially of barium titanate, the desired mechano-electric characteristics may be induced therein by applying thereto the charging potential only for about a few minutes, at room temperature of about 25° C. Thus, if such capacitor unit is subjected to a charging potential for five minutes, its mechano-electric output or sensitivity will not be materially increased beyond that it acquires within the first five minutes of the charging process.

For transducers having dielectric bodies composed of other titanates, the required charging time will vary. Thus, in the case of a transducer having a dielectric layer composed of about 70 percent barium titanate and about 30 percent strontium titanate in solid solution, a charging period of several days may be required in order to induce therein desired permanent mechano-electric characteristics.

Summarizing, we have discovered that such transducer elements having a solid titanate dielectric layer formed of random oriented particles, when subjected to a deformation which causes it to change its capacity, will produce voltages corresponding to the deformation not only in the presence of an externally applied electrically polarizing field, but also as a result of permanent displacement of electric charges in the internal structure of the dielectric imparted thereto by subjecting it to an electric polarizing process, and which gives it what appears to be permanent dielectrostrictive properties which it did not exhibit prior to the polarizing process.

According to the invention, permanent electric polarization or dielectrostrictive characteristics are imparted to the dielectric titanate structure of such transducer, by connecting it to a source of D. C. potential so that a voltage gradient of about 60 volts per $1/1000$ inch thickness is applied thereto for a shorter or longer period of time from about five minutes or less up to one or more days, depending on the characteristics of the specific titanate body. When such a polarity of capacitor sections or elements are combined into bilaminates, such permanently induced polarization may be conveniently applied to them, and in the proper sense, so that their effectiveness aids when functioning as a mechano-electric transducer.

Figure 3:
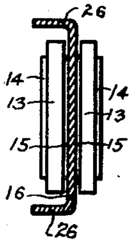
Fig. 3 is a cross-sectional view along line 3—3 of Fig. 2.

A dielectrostrictive transducer structure of the invention, such as shown in Figs. 1 to 3, may be used either for transforming mechanical strains or motions into electric signals, or vice versa.

Figs. 1 and 2 indicate in a diagrammatic manner one way in which such transducer structure of the invention may be utilized as a mechano-electric transducer unit operating with a bending mode. As shown, the left end of the backing strip 16 is provided with two angularly bent flange portions 25, and the right end of the backing strip is likewise provided with two angularly bent flange portions 26, both sets of flange portions 25, 26 overlapping the adjacent end portions of the capacitor elements 11, 12 which are united to the backing strip 16. Because of this arrangement bending forces imparted to the flanged end portions of the backing strip will cause the entire length of the two capacitor elements 11, 12 to bend as a unit, so that the bending forces applied to the ends of the backing strips are properly transmitted to the entire length of the capacitor structure united to the backing strips.

Thus the left end of the backing strip which is stiffened by its angularly bent flanges 25 may be mounted or clamped to a support 27 and the right end portion of the backing strip may be flexed by vibratory forces M. Thus the structure of Figs. 1 to 3 may be considered to represent a part of a phonograph pickup, the rear end of which is clamped to a mounting support and the front end of which is arranged to be vibrated by a phonograph needle.

Instead of providing the rear end of such transducer structure with a stiffened mounting end, the proper distribution of the mechanical forces over the capacitor transducer elements 11, 12 thereof may be obtained by embedding a larger or shorter length of the two outer sides of the capacitor elements 11, 12 between layers, pads or a body 28 of flexible, elastically yieldable cushioning material so that when the forward end of the capacitor structure is flexed the cushioning bodies 28 within which the transducer is embedded will react against the flexed capacitor elements and provide the desired distribution of the strains along their entire length. The elastically yieldable body 28 may be made of a material such as vinylchloride which is plasticized so as to be soft and exhibit rubbery elastic characteristics and is effective in internally dissipating vibratory energy imparted thereto.

When a dielectrostrictive transducer structure of the type described above in connection with Figs. 1 to 3 is connected with its exterior surface electrodes to a source of electric oscillations, the two ends of the transducer structure will vibrate with a bending mode in a direction perpendicular to the plane of the transducer structure. If the left end of such transducer structure is restrained against vibrations either by clamping it to a support 27 or embedding it within a soft compliant body 28, its right end will vibrate in the direction indicated by the arrows M in Fig. 1 when the exterior electrodes of its two capacitor elements 11 and 12 are connected to a source of electric oscillations.

In the arrangement shown the backing sheet element 16 is made of conductive material and provides an electrical circuit connection between the inwardly facing surface electrodes 15 of the two capacitor elements 11, 12. In some applications it may be desirable to make the backing sheet element 16 of electrically non-conductive material, in which case the circuit connection between the two capacitor elements may be provided by a suitable electrically conductive jumper element of metallic foil, for instance, extending between the two facing electrode surfaces.

In accordance with the invention, the individual electrodes of a single integral dielectric body of a capacitor or transducer such as shown in Figs. 1 through 3, may be subdivided so as to provide several, or at least two capacitor or transducer sections on the same integral or common dielectric body, different sections of which are differently polarized so that the different body sections of such integral body will transduce with distinct electric signals and operate in aiding relation as a mechano-electric transducer having a predetermined vibratory mode.

Figs. 1–A, 2–A, 3–A show a dielectrostrictive capacitor transducer unit exemplifying the invention. It comprises two capacitor units 11–*a*, 12–*a*. Each capacitor unit 11–*a*, 12–*a* comprises a similar solid strip 13 of solid dielectric titanate material provided along one extended surface with a surface electrode 19 facing a backing sheet 16 and having on its opposite side two extended surface electrodes 23, 24 each cooperating with substantially one-half of the inner surface electrode 19. This electrode arrangement is indicated for the capacitor unit 11–*a* in the plan view of Fig. 2–A where the outer surface electrodes 23, 24 are shown extending over one-half of the inner surface electrode 19 which is indicated, for the sake of clarity, in dotted lines as extending somewhat beyond the boundaries of the two outer electrodes 23, 24 in a simplified manner.

With such arrangement each of the two capacitor units 11–*a*, 12–*a* actually constitutes two capacitor sections interconnected by the common electrode 19. This cooperative arrangement of the two capacitor sections associated with a single dielectric layer 13 is shown diagrammatically in Fig. 4–A for the capacitor unit 11–*a*, where the two capacitor sections 23—19 and 24—19 are indicated by portions of the common electrode 19 each cooperating with a facing portion of the sectional electrodes 23, 24 extending over the opposite side of the dielectric layer 13, the electrode portions of the common electrode 19 being shown electrically connected to each other. In other words, with such capacitor transducer arrangement of the invention, one part of a large common surface electrode 19 of each capacitor element 11–*a*, 12–*a* cooperates with opposite surface electrodes 23, 24 so as to form two distinct capacitor sections associated with a single solid dielectric titanate body.

The operation of the integral dielectric body of a single capacitor unit such as unit 11–*a* of Figs. 1–A, 2–A, and 3–A, with its two transducer sections extending between the common electrode 19 and the cooperating circuit electrodes 23, 24, as indicated in Fig. 4, is identical with the operation of the corresponding dielectric body of such signal transducer described in connection with Figs. 4 through 6–A of our copending application Serial No. 727,152, filed February 7, 1947, of which this application is a continuation-in-part. In such integral dielectric body having at least two differentially polarized dielectric body sections, they will operate with distinct electric signals in transducing mechanical energy into electrical energy and vice versa.

Obviously, if a transducer structure formed of an integral dielectric titanate body having two differentially polarized body sections such as described above in connection with Figs. 1–A through 3–A, is to operate with a vibratory mode other than the longitudinal vibratory mode of the example just described above, the two different transducer body sections of the common dielectric titanate body 13 will be differentially polarized in an analogous way to assure their conjoint aiding operation when performing piezoelectric transducer operations. By way of example, if a transducer structure consisting of two differentially polarized dielectric body sections such as explained above in connection with Figs. 4–A to 4–AC, is to operate with a vibratory bending mode similar to that described in connection with the transducer of Figs. 1 to 3, the two transducer body sections of the common transducer body 13 will be given a shape analogous to that of the transducer of Figs. 1 through 3, with the two dielectric body sections extending between their intermediate electrode 19 and their circuit electrodes 23, 24, differentially polarized as in the transducer of Figs. 1 to 3, causing them to operate in the same way as the transducer of Figs. 1 to 3, with their polarization in opposite directions through the spaces occupied by the two transducer body sections.

We have found that when the solid dielectric layer 13 of such or generally similar multi-section transducer is composed essentially of polygranular random oriented titanate particles, it may be electrically polarized so that adjacent sections of the continuous dielectric layer 13 are of oppositely sensed permanent electric polarization in such manner that when the dielectric body of the capacitor unit is subjected to similarly sensed strains it will generate at its electrodes distinct oppositely sensed voltages or signals.

Similarly, the different sections of the common dielectric layer 13 of such multi-section capacitor unit may be permanently electrically polarized in an opposite sense so that when two different sections of the single common dielectric layer are subjected to opposite mechanical strains they will generate voltages which will aid in the desired circuit interconnection between such capacitor sections.

Thus, if such capacitor unit, for instance unit 11–*a*, is subjected to a tension strain in the direction of its longitudinal axis, its dielectric constant and the capacity of both capacitor elements will decrease. Conversely, if such capacitor unit is subjected to longitudinal compression forces, the dielectric constant, and hence the capacity of the two capacitor elements will be increased. We have found that adjacent capacitor sections of such capacitor unit may be permanently electrically polarized in opposite sense so that when both capacitor sections of such unit are simultaneously subjected to the same character of strain the changes of the dielectric constant or the capacity of the two serially connected capacitor elements of each capacitor unit 11–*a*, 12–*a* will produce oppositely sensed voltages which aid serially in the series circuit connection of such capacitor unit. In other words, we have found that a different character of permanent electric polarization may be imparted to different portions of the same polygranular titanate dielectric body of such capacitor structure so as to produce a variety of desired effects by changes in the dielectric constant imparted to such capacitor through external strains applied thereto.

Thus in order to cause one of the capacitor units 11–*a* of Figs. 1–A, 3–A to generate aiding voltages in its two serially connected capacitor sections, the desired internal polarization may be imparted to its titanate particles by connecting the two serially acting capacitor elements 23—19, 24—19 in series with a D. C. source, in the manner indicated in Fig. 4–A by D. C. batteries 21–*a* and 21–*b*. In Fig. 4–A the polarizing circuit is shown established by a set of three switches 22–*a*, 22–*b*, 22–*c*, the polarizing circuits being completed by the conventionally shown grounds and by a return resistor 29. In this polarizing circuit arrangement the current limiting resistor 29 serves also to prevent the application of a dangerous electric shock to the personnel.

Alternatively, as shown in Fig. 4–AB a single battery 21–*d* may be utilized for charging the two capacitor sections 19—23, 19—24 of a single capacitor unit, such as capacitor unit 11–*a*, by connecting the battery 21–*d* in series circuit relationship with the two capacitor sections 19—23, 19—24. A resistance 29 is shown connected parallel to each capacitor section so as to properly divide the polarizing potentials applied by the single battery 21–*d* to the capacitor sections of the single capacitor unit.

In Fig. 1–A and in the diagram of Fig. 4–AB the arrow F indicates the direction of the extension force applied to the two capacitor sections 19—23, 19—24 of the capacitor unit 11–*a*. The polarization imparted to the dielectric layer portions of the two capacitor sections 19—23, 19—24 is indicated in Fig. 4–AB by (+) and (−) signs applied to the leads from the individual capacitor elements. The legends "$\pm e$" and "$\mp e$" applied in Fig. 4–AB to the two capacitor sections of the single capacitor unit 11–*a* indicate the change in the potential produced by the effect of the tension forces F on the dielectric constant and the capacity of the two capacitor sections 19—23, 19—24 when their respective portions of the dielectric layer 13 have been permanently polarized by a D. C. potential in the manner indicated by the polarity of the charging source 21–*a*, 21–*b* and by the (+) and (−) signs applied to the individual capacitor electrodes.

It will be seen that although the two capacitor sections 19—23, 19—24 are formed along adjacent portions of the same continuous dielectric body 13, the D. C. voltage charge, and hence the permanent electric polarization imparted to the dielectric particles of the two capacitor sections is opposite, so as to cause them to generate serially aiding voltages when the dielectric structure of both capacitor sections is subjected to a mechanical strain of the same direction.

By joining two multi-sectional capacitor units 11–*a*, 12–*a* to a common non-conducting backing sheet member 16–*a* in the manner indicated in Figs. 1–A to 3–A, the four capacitor sections of such transducer structure may be interconnected so as to generate serially aiding voltages, provided the individual capacitor sections of each capacitor unit have been previously polarized in the proper sense, in the manner indicated in Fig. 4–AC by the (+) and (−) signs applied to the capacitor sections 19—23, 19—24 of each unit.

A capacitor unit of the general type described above in connection with Figs. 1–A to 3–A combining a plurality of serially interconnected capacitor sections having a single common dielectric layer of random oriented titanate particles the different sections of which are polarized in selectively different senses may be operated with the capacitor sections connected in series or other circuit arrangement for transducing electric voltages applied to the serially connected capacitor sections of a single capacitor unit into corresponding mechanical motions or strains.

In the signal transducer formed by the ceramic body 11–*a* of Figs. 1 to 4–A, wherein two ceramic body portions along an extended surface are polarized in opposite directions, the oppositely polarized ceramic body portions may be described as having opposite piezoelectric axes.

In Figs. 1–B, 2–B there is shown another form of polarized titanate capacitor transducer structure of the invention. It comprises two flat capacitor units 11–*b*, 12–*b* united to the opposite sides of a common backing sheet member 16–*b*. Each of the two capacitor units 11–*b*, 12 *b* comprises a generally rectangular thin layer or strip 13 of solid dielectric material composed essentially of random oriented titanate particles. The two flat surfaces of the dielectric layer 13 of each condenser unit are provided with a set of outer electrodes 31, 32 and a set of co-extensive inner electrodes 33, 34, respectively, each pair of cooperating electrodes 31—33, 32—34 extending over one-half, or generally the same fraction, of the area of the dielectric layer 13 of the capacitor unit.

The adjacent sections of the common titanate dielectric body 13 of each capacitor unit 11–*b*, 12–*b* is polarized in the proper sense so that when the several capacitor sections of the common transducer structure are operated, as by bending or the like, the voltages induced in the suitably interconnected individual capacitor sections will aid, and that when electric potentials are applied to the so-interconnected capacitor sections the mechanical forces produced thereby will likewise aid and cooperate.

The circuit diagram of Fig. 4–B shows one type of circuit interconnections as well as the electric polarization imparted to the dielectric structure of the several capacitor sections of a transducer structure of the type shown in Fig. 1–B. Thus when the transducer unit of Figs. 1–B, 2–B has its free ends restrained against lateral motion—as by backing bodies indicated by dash-line 28 in Fig. 1–B—and its central portion is subjected to torsional forces M shown in Fig. 1–B—around a central axis indicated by the dash-dot-line 30 in Fig. 2–B—the individual capacitor sections of the two capacitor units 11–*b*, 12–*b* will be subjected to longitudinal strains indicated by arrows F in Fig. 1–B.

Fig. 1–B shows by (+) and (−) signs the permanent electric polarization that has to be applied to the individual condenser sections 31—33, 32—34 of the two condenser units 11–*b*, 12–*b* in order to produce in the individual condenser sections aiding voltages when they are interconnected in the manner shown in Fig. 4–B, which also indicates by arrows F the strains imparted to the individual condenser sections. It will be noted that with the circuit arrangement shown in Fig. 4–B, the two condenser sections 31—33, 32—34 of each condenser unit are connected in parallel and the two parallel-connected sections are in turn connected in series to the external circuit. With such arrangement the backing member 16–*b* of the transducer structure may be made of metal, and each of the two inner electrodes 33, 34 of each condenser unit 11–*b*, 12–*b* may be united by soldering to the common metallic backing member 16–*b*.

If it is desired to assure that the capacitor sections of the several capacitor units 11–*b*, 12–*b* act electrically in series, the individual capacitor sections should be electrically polarized in the manner indicated by (+) and (−) signs in Fig. 4–BC.

Fig. 4–BC also shows the series circuit connection between the elements, and the voltages generated in the individual capacitor sections when they are subjected to the forces F applied to them under such operating conditions. It will be noted that with the arrangement and polarization shown in Fig. 4–BC the voltages generated in the individual units, indicated by $\pm e$ and $\mp e$, will aid serially in all four capacitor sections of the two capacitor units 11–*b*, 12–*b*.

A feature of the invention is the fact that capacitor sections may be placed in parrallel connection even though they are individually polarized in opposite senses, as shown in Fig. 4–B for example. Although it might be expected that no such polarization can be maintained because it appears to require one connected pair of electrodes to be simultaneously at a higher and lower potential than the other, the described arrangement is operative to produce the transducing expected from the summation of the transducing actions of the individual transducers. The polarization produced in accordance with the invention therefore appears to be independent of the circuit connections in which the capacitor elements are used and to merely reside in the dielectric. The assembly of Fig. 4–B may be produced by first polarizing the individual capacitor elements and subsequently connecting them in the circuit shown.

Figs. 1–C and 2–C show a further form of a dielectrostrictive polarized titanate condenser transducer of the invention. It comprises two generally flat capacitor units 11–*c*, 12–*c* united to the opposite sides of a common backing sheet member 16–*c*. Each of the two capacitor units 11–*c*, 12–*c* is shown provided with a set of four outer surface electrodes 35, 36, 37, 38 and a set of three inner surface electrodes 41, 42, 43 covering sections of the outer and inner surface, respectively, of the solid dielectric layer 13–*c*.

The opposite electrode sets 35, 36, 37, 38, and 41, 42 43 of each capacitor unit 11–*c*, 12–*c* overlap each other and the two outer end electrodes 35 and 38 of each capacitor unit are only half the area of the other electrodes, and they are so arranged that they form with the common polarized dielectric layer 13–*c* of each capacitor unit six capacitor sections 35—41, 36—41, 36—42, 37—42, 37—43, 38—43 which are serially connected in the manner indicated in the circuit diagram of Fig. 4–C, in which the individual capacitor sections are designated by the reference numerals applied to their electrodes.

If it is desired to operate several capacitor sections of the two capacitor units so that they generate serially aiding voltages when the transducer structure is subjected, for instance, to bending strain and the individual capacitor units are subjected to mechanical strain indicated by the arrows F applied to Fig. 1–C, the backing sheet member 16–*c* has to be made of electrically insulated material in order not to short-circuit the individual electrode sections of each capacitor unit.

The permanent electric polarization imparted to the different sections of the random oriented titanate particles of the dielectric layer 13 of each capacitor unit is indicated in Fig. 4–C by the (+) and (−) signs applied to the individual serially connected capacitor sections.

It will be noted that the multi-section arrangement shown assures that the several capacitor sections of each of the capacitor units 11–*c*, 12–*c* are interconnected in series through their inner electrodes 41, 42, 43 so that the external circuit connections to each of the capacitor units may be completed by terminal leads connected to the exterior electrodes of the respective capacitor units, such as outer electrode 35 or outer electrode 38 of such capacitor unit.

In the signal transducer described above in connection with Figs. 1–C through 4–C, each of the two ceramic body layers 11–C and 12–C, is provided with a series of outer electrodes 35, 36, 37, 38, by means of which adjacent body portions of the same integral ceramic body are differently polarized along a major extended surface thereof so that the direction of the polarization or of the piezoelectric axis of each body layer 11–C varies at a non-uniform rate from portion to portion along the major extended surface of each ceramic body, with the direction of the polarization or of the piezoelectric axis of some body portions being opposite to the direction of polarization or piezoelectric axis of other body portions positioned along a major extended surface of the same integral ceramic body.

In the transducer capacitor combination described above in connection with Figs. 1 to 4–A, compression and tension strains are imparted to the dielectric structure of the capacitor elements incident to energy transducing operations. The various arrangements shown make it possible to impart to the transducer capacitor elements compression and tension forces in the direction of their major dimensions by relative flexure of a transducer unit.

It should also be noted that energy transducer structures such as described in connection with Figs. 1 and 2 will perform in the manner described also if their facing sets of surface electrodes are directly united to each other into a bilaminate without an intermediate backing sheet member. However, the combination of such bilaminate with an intermediate backing member of ductile material is of very great advantage because it makes it possible to utilize the fragile capacitor structure in a much more effective way and without loss of energy that would have to be dissipated by resort to other arrangements.

Figs. 1–D, 2–D and 2–DE show a still further form of dielectrostrictive transducer capacitor structure of the invention. It comprises two flat capacitor units 11–*d*, 12–*d* flatwise united to each other into a bilaminate transducer structure. Each of the two capacitor units 11–*d*, 12–*d* comprises a generally rectangular layer or strip 13 of solid dielectric material composed, as in the previously described structures, essentially of random oriented titanate particles.

Each of the two capacitor units 11–*d*, 12–*d* has two outer surface electrodes 44, 45 united to the outer side of its dielectric layer 13 and three cooperating inner surface electrodes 46, 47, 48 united to the opposite side of its dielectric layer.

As seen in Figs. 1–D, 2–D, 2–DE, the opposite coextensive electrodes 44 and 46 of each capacitor unit 11–*d*, 12–*d* constitute one capacitor section, and the additional outer surface electrode 45 of each capacitor unit has twice as great an area and cooperates with two opposing inner surface electrodes 47 and 48 of half its area so as to form therewith two additional capacitor sections of the same capacitor unit. The two superposed capacitor units 11–*d*, 12–*d* are united to each other by a layer of ductile solder material 49 thereby joining the inwardly facing surface electrodes 46—48, 47—47, 48—46 of the two capacitor units into a laminated transducer structure so that the three capacitor sections of capacitor unit 11–*d* and the three capacitor sections of the adjacent capacitor unit 12–*d* are electrically connected in series in the manner indicated in the diagram of Fig. 4–D.

Fig. 4–D also indicates the polarity of the permanent electric polarization which has to be imparted to the individual capacitor sections of the two capacitor units 11–*d*, 12–*d* in order to assure that they generate aiding voltages when the combined bilaminate transducer capacitor structure shown in Figs. 1–D, 2–D is subjected to bending forces which subject the dielectric structure of the individual capacitor units to deformation forces indicated by arrows F in Figs. 1–D and 4–D. Fig. 4–D also indicates by $\pm e$ and $\mp e$ the relative polarity of the aiding voltages generated in the so polarized individual capacitor sections when their dielectric body is subjected to deformation forces F.

There have been described above in connection with Figs. 1–A, 2–A, 2–B, 1–C, 2–C, 1–D, 2–D, various forms of multi-sectional capacitor transducer units of the invention in which random oriented titanate particles of a single solid capacitor dielectric layer have adjacent dielectric layer sections which are permanently electrically polarized in opposite senses in order to secure an aiding cooperative relationship between a plurality of capacitor transducer sections of a single capacitor unit. It is understood, of course, that in an analogous manner generally similar capacitor units may be designed to have much larger numbers of oppositely polarized dielectric layer sections which are interconnected and polarized in the proper sense in order to produce the desired selective cooperative action.

It will be seen that by combining two multi-sectional capacitor units in a manner generally similar to that described above in connection with Figs. 1–D to 4–D it is possible to join a pile of superposed multi-sectional capacitor units into a capacitor transducer body of any desired large dimensions with the different capacitor sections of the different capacitor units of the pile connected in series in a direction transverse to the pile of the individual capacitor sections of the individual capacitor units permanently electrically polarized in such manner that the distinct voltages generated by the individual capacitor sections aid serially in the desired circuit arrangement, notwithstanding that adjacent dielectric layer sections of the individual capacitor units are subjected to mechanical strains which would produce mutual subtractive voltages had they been permanently polarized in the same sense.

With a pile of multi-sectional capacitor units made in the manner generally similar to that described above in connection with Figs. 1–D to 4–D, the external circuit connections have to be provided only to external electrodes such as the external electrodes 44 and 45 of the two capacitor units 11–*d*, 12–*d* shown, since all other sectional electrodes of the superposed pile of capacitor units are electrically interconnected by soldering or metallic joints between facing electrode sections of the capacitor unit pile.

In order to make it possible to solder adjacent surface electrode sections of one capacitor unit to facing electrode sections of the adjacent capacitor unit of such pile without causing electric short-circuit between adjacent surface electrode sections, the individual capacitor units are shown provided with barrier elements 50 of insulating material such as plastic, synthetic resin or ceramic material. These insulating barriers 50 are applied to the surface portions of the dielectric layer 13 of each capacitor unit which is exposed between the boundaries of the adjacent surface electrodes, such as surface electrodes 46, 47 and 48. The insulating barriers 50 may be made of plastic, synthetic resin or ceramic material which softens when heated to a temperature required to fuse the solder layers 49 which serve to solder facing electrode sections of superposed capacitor units. There are available various thermoplastic synthetic resins and plastic materials which may be used to provide such insulating barriers, which will keep the solder layers 49 from overflowing across a barrier while the facing surface electrode sections of a superposed pile of such capacitor unit is held under pressure and heated to effect the soldering joint between the superposed electrode sections.

In the above-described modifications of the invention the transducer capacitor elements have been described as placed under compression or tension to generate the desired signals. It has also been stated that a balanced action may be obtained by arranging that alternate compression and tension of a capacitor element produces an alternating signal.

It is well known that ceramic bodies such as the capacitor dielectrics of the invention exhibit only small tensile strength although they are quite resistant to compressive forces. It is accordingly another feature of the instant invention to provide a dielectrostrictive capacitor transducer in which a ceramic capacitor dielectric is prestressed in compression so that during transducing operations the compressive stress on the dielectric is increased or diminished but the dielectric is never subjected to any appreciable tension. According to this phase of the invention, the range of stress variations to which a dielectric is subjected may be considerably broadened without exceeding its tensile tolerance. Breakage of dielectrics is also considerably reduced.

Another advantage of the pre-stressed dielectric construction is the resulting greater uniformity of operation. The signal or voltage change induced in a condenser element may in some cases be unsymmetrical, that is, the voltage change may be of different amplitude for a compressive strain than for an equal tensile strain, or vice versa. As a result signal production by strains alternating between compressive and tensile may sometimes be distorted. Similarly, the production of mechanical vibrations by the application of alternating voltages to a capacitor transducer element may also be affected by the non-symmetry.

One simple arrangement for pre-stressing the capacitor transducer dielectrics in compression is to secure an electrode to one of its faces by a thermal operation, selecting the electrode material to have a thermal coefficient of expansion different from that of the capacitor dielectric. Thus, for example, Phosphor bronze or steel have thermal coefficients of expansion appreciably larger than that of the dielectric and may be directly united to a surface of the dielectric that is covered with a thin sprayed or baked film of metal such as silver or copper. One practical method of uniting is to apply a thin layer of solder to a Phosphor bronze or steel sheet, then place the composite with the soldered surface against the metal filmed surface of the dielectric and heating the assembly till the solder flows and unites the metal sheet to the metal film. The assembly is then permitted to cool whereupon the uniting solder layer solidifies and further cooling causes the greater thermal shrinkage of the metal sheet to bring the dielectric body into the desired compression. The pre-stressing element is placed under considerable tension at the same time as the dielectric is placed in compression and it is important that the former be of the required tensile strength.

The pre-stressing need only be applied to one surface layer of the thin capacitor dielectric. For greater simplicity the pre-stressing element may also be the backing sheet member 16, 16A, 16B, 16C or 16D as described in connection with Figs. 1 to 4–D so that the assembly operation remains quite simple. The pre-stressing may be modified to suit conditions and may only be partial so that some tension is permitted to develop in the dielectric during use. Other techniques for applying the compressive bias may also be used.

It is accordingly understood that in the specification or claims where the capacitor transducer dielectric is described as placed under tension or compression, these terms are only relative and that when referring to prestressed dielectrics the tension may merely be a relatively lower degree of compression.

Although the dielectrostrictive transducer action of capacitors or condensers having a solid ceramic dielectric layer of random oriented titanate particles which have been electrically permanently polarized in a common direction is in its nature different from the piezoelectric transducer action of piezoelectric crystal transducers having especially oriented slabs of a piezoelectric crystal of quartz, Rochelle salt or the like, the dielectrostrictive transducers of the present invention are suitable for use with great advantage in substantially all applications and arrangements in which piezoelectric crystal transducers are or have been used and will produce therein similar results. However, because of their special character, the dielectrostrictive transducers of the invention may be used in a variety of applications and arrangements to which piezoelectric crystal transducers could not have been applied.

In a similar way dielectrostrictive transducers of the invention are suitable for use with great advantage in lieu of magnetostrictive transducers in substantially all applications in which the latter are or have been used.

In order to enable those skilled in the art to readily practice the invention and without thereby limiting its scope there are given below, by way of example, the data regarding physical characteristics of one polarized titanate capacitor element of the invention made from commercially available titanate ceramics. The specific capacitor element referred to above has a solid dielectric titanate layer .010 inch thick and an area 1 x .25 inch. Its solid dielectric structure consisted essentially of barium titanate.

In Fig. 5, the curve C–1 shows the capacity of such capacitor element as a function of the temperature indicated on the abscissae axis. It will be noted that the capacitor element in question exhibits a maximum capacity at about 120° C. Dash-line curve branches E–1, E–2 represent the piezoelectric output voltage as a function of the temperature, when a constant displacement is imparted to the element. It will be seen, that when the temperature is first increased from the low value to the highest value and then decreased from the highest value to the lowest value, as indicated by the arrows on curve branches E–1, E–2, the piezoelectric voltage output of the capacitor element drops when the temperature of the titanate capacitor is brought to a value at which it has the highest maximum capacity, and that its piezoelectric output voltage remains low when the temperature of the capacitor element is thereafter decreased along curve E–2.

In Fig. 5, the dash-double-dot line E–3 gives the piezoelectric output voltage of the capacitor element, when after its temperature has been raised up to about 70° C., its temperature is lowered to its normal value from 70° C. to which it was first raised. Curve E–3 shows that if the temperature of the capacitor element is not raised to too high a value, raising and lowering of the temperature does not materially affect its piezoelectric output voltage. For practical purposes the voltage characteristic E–3 substantially coincides over the range up to about 50° C. with the curve E–1. It is also of interest to know that in performing the tests represented by curves E–1, E–3, the capacitor element was retained at a temperature of 70° C. for an extended period of about 36 hours without any apparent loss of its piezoelectric voltage output.

Dot-line curve P–1 shows the output voltage of the capacitor under constant mechanical displacement corresponding to the curves E–1, E–2, E–3, when its electrodes are connected to an external voltage source which was used to polarize the capacitor and give it the piezoelectric characteristics represented by curves E–1, E–2, E–3. It will be noted that when the temperature of the capacitor element is reduced even below minus 60° C., its piezoelectric output is not materially reduced.

We have found that generally similar characteristics are exhibited by capacitors having dielectric bodies composed of titanates other than barium titanate alone. By way of example, there are given below data for a titanate capacitor unit having a dielectric body containing about 70 percent barium titanate and about 30 percent strontium titanate in solid solution. This capacitor element had a highest maximum capacity at about 40° C. The other characteristics of this capacitor unit are qualitatively similar to those represented by the curves C–1, E–1, E–2, E–3, and P–1, except that the curves are shifted more to the left and that the ratio of ordinates of curve E–1 to ordinates of curve P–1 was only about 30 percent as against 70 percent for the curves of Fig. 5.

In Fig. 6, curve P–*a* represents the piezoelectric voltage output displacement corresponding to the voltage gradient of the charging potential applied to a capacitor element having the characteristics shown in the curves of Fig. 5 when the charging source remained connected to the capacitor; curve E–*a* of Fig. 6 represents the corresponding piezoelectric voltage output when the charging source is disconnected from the capacitor.

As shown in curves P–*a* and E–*a*, the piezoelectric output voltage or sensitivity rises to an asymptotic value as the voltage gradient of the charging voltage is increased and remains at a substantially constant value as the voltage is further increased till the breakdown voltage which occurs for the specific capacitor unit at a voltage gradient of about 100 volts per one thousandth of an inch.

When operating with a capacitor element of the invention having a titanate body which was composed of about 70 percent barium titanate and about 30 percent strontium titanate in solid solution, there was obtained a piezoelectric output or sensitivity characteristic represented by curve E–6 in Fig. 6.

Capacitors made with other titanate compositions will exhibit generally similar characteristics, such as represented by curve E–*x* in Fig. 6.

Depending on the composition of the titanate dielectric body of a piezoelectric capacitor of the invention, a longer or shorter period of charging period is required in order to induce in it the desired piezoelectric characteristics. Thus, in a case of a capacitor unit having a dielectric body consisting essentially of barium titanate, the desired piezoelectric characteristics may be induced therein by applying thereto the charging potential only for about a few minutes, at room temperature of about 25° C. Thus, if such capacitor unit is subjected to a charging potential for five minutes, and if it is thereafter left connected to the charging source, its piezoelectric output or sensitivity will not be materially increased beyond that which it acquires within the first five minutes of the charging process.

For capacitor units having dielectric bodies composed of other titanates, the required charging time will vary. Thus, in case of a capacitor having a dielectric layer composed of about 70 percent barium titanate and about 30 percent strontium titanate in solid solution, a charging period of several days may be required in order to induce therein desired permanent piezoelectric characteristics.

Summarizing, we have found that such capacitor elements having a solid dielectric layer formed of random oriented crystal particles, such as titanate particles which have piezoelectric characteristics, will when subjected to a deformation which causes it to change its capacity, produce voltages corresponding to the deformation not only in the presence of an externally applied electrically polarizing field but also as a result of permanent displacement of electric charges in the internal structure of the dielectric imparted thereto by subjecting it to an electric polarizing process, and which gives it what appears to be piezoelectric properties in a common direction.

According to the invention, permanent electric polarization or piezoelectric characteristics in a common direction may be imparted to the dielectric titanate structure of such capacitor unit, by connecting it to a source of D. C. potential so that a voltage gradient of about 50 volts per 1/1000 inch thickness is applied thereto for a shorter or longer period of time from about five minutes or less up to one or more days, depending on the characteristics of the specific titanate body. When such a plurality of capacitor sections or elements are combined into bilaminates, such permanently induced polarization may be conveniently applied to them, and in the proper sense, so their effectiveness aids when functioning as a mechano-electric transducer.

This application is a division of application Serial No. 772,934, filed September 9, 1947, now Patent 2,769,867, which was filed as a continuation-in-part of co-pending applications Serial No. 694,386, filed August 31, 1946, and Serial No. 727,152, filed February 7, 1947.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

We claim:

1. In a signal transducer operating with a predetermined mechanical mode for transducing mechanical signals into electric signals or vice versa, a transducing element including a solid ceramic polycrystalline body having at least one major bounding surface and in which a large number of random-oriented crystal particles are bonded together, which crystals may be rendered piezoelectric in a common selected direction, said body having permanent piezoelectric properties imparted by temporary application of electric polarization to said body, and the direction of the piezoelectric axis varying at a non-uniform rate from body portion to body portion along at least one major surface of said body for transducing with distinct electric signals in the different body portions.

2. In a signal transducer operating with a predetermined mechanical mode for transducing mechanical signals into electric signals or vice versa, a transducing element including a solid polycrystalline body having at least one major bounding surface, said body including a large number of random-oriented minute crystal particles consisting principally of a titanate, which particles are ceramically bonded into a solid body, said body possessing permanent piezoelectric properties imparted by temporary application of electric polarization to said body, and the direction of the piezoelectric axis varying at a non-uniform rate from body portion to body portion along at least one major surface of said body for transducing with distinct electric signals in the different body portions.

3. In a signal transducer operating with a predetermined mechanical mode for transducing mechanical signals into electric signals or vice versa, a transducing element including a solid polycrystalline body having at least one major bounding surface, said body including a large number of random-oriented minute crystal particles consisting principally of barium titanate, which particles are ceramically bonded into a solid body, said body possessing permanent piezoelectric properties imparted by temporary application of electric polarization to said body, and the direction of the piezoelectric axis varying at a non-uniform rate from body portion to body portion along at least one major surface of said body for transducing with distinct electric signals in the different body portions.

4. In a signal transducer for transducing mechanical signals into electric signals and vice versa, a transducer element operating with a predetermined mechanical mode having electrical terminals and including a solid ceramic polycrystalline body having at least one major bounding surface and in which a large number of minute random-oriented individual crystals which may be rendered piezoelectric in a common selected direction are bonded together, said body having permanent piezoelectric properties imparted by temporary application of electric polarization to said body, and the direction of the piezoelectric axis being substantially opposite relatively to each other in adjacent body portions of said body along said surface for transducing with distinct electric signals in the different body portions.

5. In a signal transducer for transducing mechanical signals into electric signals and vice versa, a transducing element operating with a predetermined mechanical mode having electrical terminals and including a solid polycrystalline body having at least one major bounding surface, said body including a large number of minute individual random-oriented titanate crystals which may be rendered piezoelectric in a common selected direction bonded together by a ceramic binder, said body possessing permanent piezoelectric properties imparted by temporary application of electric polarization to said body, and the direction of the piezoelectric axis being substantially opposite relatively to each other in adjacent body portions of said body along said surface for transducing with distinct electric signals in the different body portions.

6. In a signal transducer for transducing mechanical signals into electric signals and vice versa, a transducing element operating with a predetermined mechanical mode having electric terminals and including a solid polycrystalline body having at least one major bounding surface, said body including a large number of random-oriented minute individual crystals consisting principally of barium titanate bonded together by a ceramic binder, said body possessing permanent piezoelectric properties and the direction of the piezoelectric axis being substantially opposite relatively to each other in adjacent body portions of said body along said surface for transducing with distinct electric signals in the different body portions.

7. In a signal transducer for transducing mechanical signals into electric signals and vice versa, a transducing element operating with a predetermined mechanical mode including a body of solid polycrystalline material in which a large number of minute random-oriented individual crystals which may be rendered piezoelectric in a common selected direction are bonded together and having at least one major bounding surface, said body having permanent piezoelectric properties imparted by temporary application of electric polarization to said body, said body comprising at least a pair of adjacent elemental body portions along a major surface thereof, the direction of the piezoelectric axis in one of said body portions being substantially opposite relatively to the direction of the piezoelectric axis in the other of said body portions along said surface for transducing with distinct electric signals in the different body portions.

8. In a signal transducer for transducing mechanical signals into electric signals and vice versa, a transducing element operating with a predetermined mechanical mode including a solid polycrystalline body having a bounding surface and in which a large number of minute random-oriented individual crystals which may be rendered piezoelectric in a common selected direction are bonded together, said body having permanent piezoelectric properties imparted thereto by temporary application of electric polarization, and the direction of the piezoelectric axis differing abruptly from body portion to body portion in said body along said surface for transducing with distinct electric signals in the different body portions.

9. A unitary piezoelectric ceramic transducer comprising an integral ceramic body having at least one major bounding surface and in which are bonded together a large number of random-oriented crystalline particles which may be rendered piezoelectric in a common selected direction, said integral body having at least two electrodes along said bounding surface and having two body portions adjoining said electrodes which are piezoelectrically polarized in differential directions relatively to each other by temporary application of electric polarizing fields for transducing with distinct electric signals in said body portions.

10. In a signal transducer for transducing mechanical signals into electric signals and vice versa, a transducing element operating with a predetermined mechanical mode including a body having at least one major bounding surface and in which a large number of minute individual random-oriented crystals which may be rendered piezoelectric in a common selected direction are bonded together, said body having permanent piezoelectric properties imparted by temporary application of electric polarization to said body, said body comprising at least a pair of body portions along said surface wherein the direction of the piezoelectric axis relatively to said surface in one of said body portions is substantially opposite to the direction of the piezoelectric axis relatively to said surface in the other of said body portions for transducing with distinct electric signals in the different body portions.

11. In a signal transducer for transducing mechanical signals into electric signals and vice versa, a transducing element operating with a predetermined mechanical mode including a solid polycrystalline body in which a large number of minute individual titanate crystals are bonded together, said body having at least one major bounding surface and having permanent piezoelectric properties by temporary selective application of electric polarization to different body portions along said surface, and the direction of the piezoelectric axis differing abruptly from body portion to body portion in said body for transducing with distinct signals in the different body portions.

12. In a signal transducer for transducing mechanical signals into electric signals and vice versa, a unitary piezoelectric ceramic transducer comprising an integral ceramic titanate body formed of a large number of random-oriented crystals which may be rendered piezoelectric in a common selected direction, said body having at least one continuous bounding surface and having permanent piezoelectric properties imparted thereto by temporary application of electric polarization to said body, said integral body having two body portions which are polarized in opposite spacial directions relatively to each other for transducing with distinct electric signals in the different body portions.

13. In a signal transducer operating with a predetermined mechanical mode for transducing mechanical signals into electric signals and vice versa, a transducing element including a solid polycrystalline body having at least one major bounding surface and in which a large number of random-oriented minute crystal particles are bonded together, which particles may be rendered piezoelectric in a common selected direction, said body having permanent piezoelectric properties imparted by temporary application of electric polarization to said body, said body comprising a plurality of elemental body portions along said surface, the directions of the piezoelectric axis in alternate ones of said body portions being substantially identical relatively to each other, and the direction of the piezoelectric axis in adjacent body portions being substantially opposite relatively to each other for transducing with distinct electric signals in the different body portions.

14. In a signal transducer operating with a predetermined mechanical mode for transducing mechanical signals into electric signals and vice versa, a transducing element including a solid polycrystalline body having at least one major bounding surface and in which a large number of random-oriented minute crystal particles are bonded together, which particles may be rendered piezoelectric in a common selected direction, said body having permanent piezoelectric properties imparted by temporary application of electric polarization to said body, said body having a pair of oppositely disposed faces, each of said faces comprising a plurality of elemental body portions, the directions of the piezoelectric axis in alternate ones of said body portions on each face being substantially identical relatively to each other, and the direction of the piezoelectric axis in each of said body portions being substantially opposite relatively to the direction of the piezoelectric axis in any adjacent body portion of the same face for transducing with distinct electric signals in the different body portions.

15. In a signal transducer operating with a predetermined mechanical mode for transducing mechanical signals into electric signals and vice versa, a transducing element including a solid polycrystalline body having at least one major bounding surface and in which a large number of random-oriented minute crystal particles are bonded together, which particles may be rendered piezoelectric in a common selected direction, said body having permanent piezoelectric properties imparted by temporary application of electric polarization to said body, and the direction of the piezoelectric axis varying at a non-uniform rate from body portion to body portion along at least one major surface of said body and having a periodic distribution throughout said body for transducing with distinct electric signals in the different body portions.

16. The process of producing a piezoelectric effect in a solid polycrystalline body having at least one major bounding surface and in which individual random-oriented crystals are bonded together, which crystals may be rendered piezoelectric in a common selected direction, said process including producing a unidirectional electrostatic polarizing field the direction of which varies at a non-uniform rate from body portion to body portion along at least one major surface of said body, and thereby imparting to said portions piezoelectric properties varying at such non-uniform rate, and maintaining said field for a substantial period of time at least approaching that necessary for saturation of said effect.

17. The process of producing a piezoelectric effect in a solid body having at least one major bounding surface and in which individual random-oriented crystals consisting principally of barium titanate are bonded together, which crystals may be rendered piezoelectric in a common selected direction, said process including producing a unidirectional electrostatic polarizing field the direction of which varies at a non-uniform rate from body portion to body portion along at least one major surface of said body, and thereby imparting to said portions piezoelectric properties varying at such non-uniform rate, and maintaining said field for a substantial period of time at least approaching that necessary for saturation of said effect.

18. The process of producing a permanently piezoelectric ceramic body, said process comprising heating a thorough mixture of polycrystalline material and ceramic binder to a temperature sufficient to bond the individual crystals of said material together thereby to form a solid polycrystalline body of random-oriented crystals having at least one major bounding surface, which crystals may be rendered piezoelectric in a common selected direction, thereafter producing a unidirectional electrostatic polarizing field the direction of which varies at a non-uniform rate from body portion to body portion along at least one major surface of said body, and thereby imparting to said body piezoelectric properties varying at such non-uniform rate, and maintaining said field for a period of time sufficient at least to approach saturation of the piezoelectric effect in said body.

References Cited in the file of this patent

UNITED STATES PATENTS

| | | |
|---|---|---|
| 2,540,187 | Cherry | Feb. 6, 1951 |
| 2,540,194 | Ellett | Feb. 6, 1951 |